(12) United States Patent
Simonsen et al.

(10) Patent No.: US 7,184,209 B2
(45) Date of Patent: Feb. 27, 2007

(54) METHOD AND ARRANGEMENT FOR PROJECTING IMAGES

(75) Inventors: Peter Allan Simonsen, Copenhagen (DK); Morten Corell, Copenhagen (DK)

(73) Assignee: Vizoo Invest ApS, Copenhagen K (DK)

(*) Notice: Subject to any disclaimer, the term of this patent is extended or adjusted under 35 U.S.C. 154(b) by 25 days.

(21) Appl. No.: 10/739,796

(22) Filed: Apr. 26, 2004

(65) Prior Publication Data

US 2005/0078365 A1    Apr. 14, 2005

(30) Foreign Application Priority Data

Dec. 18, 2002  (DK) ............................ 2002 01938
Dec. 28, 2002  (DK) ............................ 2002 02015
Mar. 3, 2003   (DK) ............................ 2003 00328

(51) Int. Cl.
G03B 21/56   (2006.01)
G03B 21/00   (2006.01)
G02B 27/00   (2006.01)

(52) U.S. Cl. .................. 359/443; 359/460; 359/461; 359/609; 353/46

(58) Field of Classification Search ............ 359/443, 359/460, 461, 609; 353/46
See application file for complete search history.

(56) References Cited

U.S. PATENT DOCUMENTS 2,107,038 A * 2/1938 McLennan .................. 359/445
3,961,839 A * 6/1976 Brobst ........................ 359/449
5,573,325 A * 11/1996 Lekowski .................... 353/79
5,982,537 A * 11/1999 Koizumi et al. ............ 359/444
2003/0117583 A1   6/2003 Werhahn-Wunderlich

FOREIGN PATENT DOCUMENTS

| DE | 3130638 A1 | 7/1981 |
|----|------------|--------|
| EP | 0 901 038 | 3/1999 |
| GB | 396714 | 8/1933 |
| JP | 10340061 A * | 12/1998 |
| JP | 11160795 | 6/1999 |
| JP | 2002090887 A * | 3/2002 |
| WO | WO 01/01194 A1 | 1/2001 |

* cited by examiner

Primary Examiner—W. B. Perkey
Assistant Examiner—Magda Cruz
(74) Attorney, Agent, or Firm—Klein, O'Neill & Singh, LLP; Howard J. Klein

(57) ABSTRACT

Images are projected onto a projection medium including a screen, which forms an open, light-penetrable structure having a plurality of light-reflecting surface parts. The projection medium may include a screen that is perforated or net-like, such as tulle or bridal veil, or that includes transparent and opaque or light-reflecting areas. The projection screen may be positioned within a shop or another room having a show window or display window spaced from the screen. A control device, such as a touch screen, for controlling the operation of the projector, may be positioned so as to be accessible to a viewer outside the room.

20 Claims, 6 Drawing Sheets

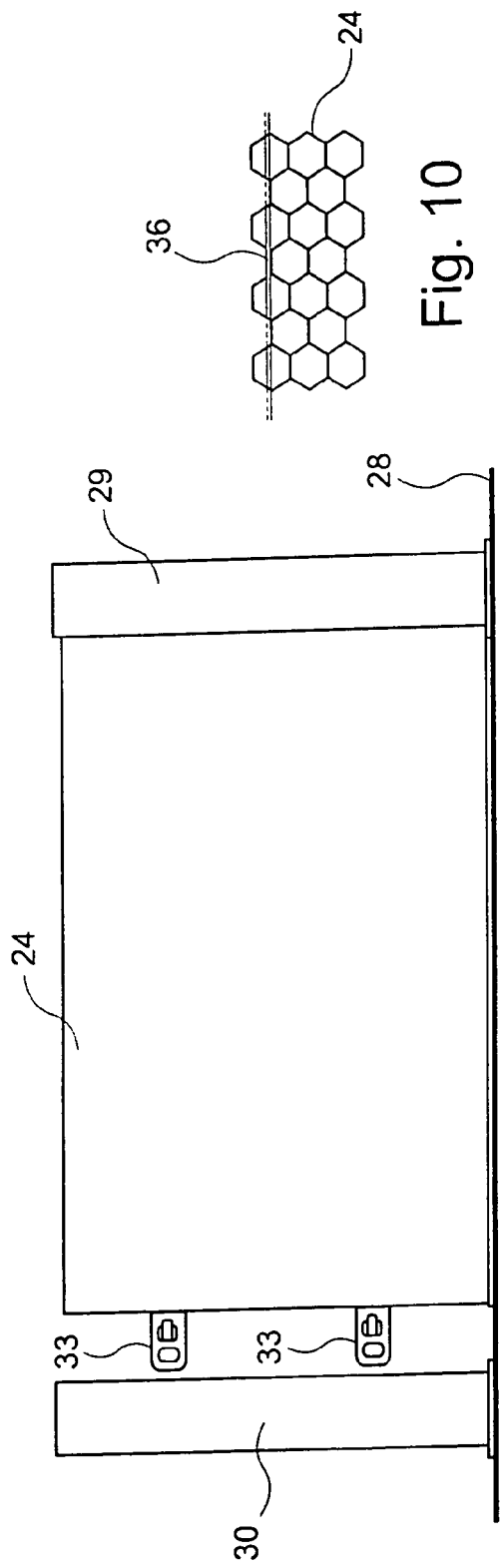
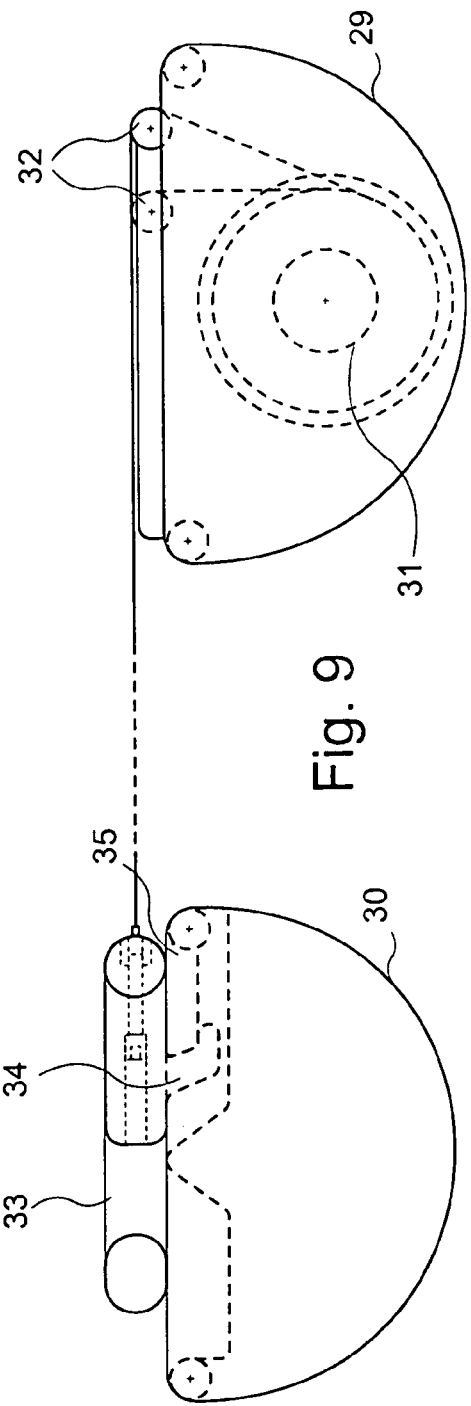

METHOD AND ARRANGEMENT FOR PROJECTING IMAGES

CROSS-REFERENCE TO RELATED APPLICATIONS (Not Applicable)

FEDERALLY SPONSORED RESEARCH OR DEVELOPMENT (Not Applicable)

BACKGROUND OF THE INVENTION

The present invention relates to a method for projecting images, preferably moving pictures, onto a projection medium.

Conventionally, such images are projected onto a solid, light reflecting screen, and the projected image may be viewed from the same side of the screen as that on which the projector is placed. However, it has also been proposed to use a mist of liquid or solid particles as a projection medium, cf. DE-A-31 30 638. This kind of projection medium is difficult to control and is not suited for indoor use.

SUMMARY OF THE INVENTION

The present invention provides a new method for projecting images onto a projection medium such that this medium may be made invisible or substantially invisible, whereby a viewer will get the impression that the projected images, such as moving pictures, are freely suspended or floating in space.

This is obtained by the method according to the invention, wherein the images are projected onto a projection medium comprising a screen forming an open, light-penetrable structure being formed by a plurality of adjacent small light-penetrable and light-reflecting areas, respectively.

The open structure of the screen may be formed by a plurality of adjacent small light-penetrable and light-reflecting areas, respectively. Thus, like conventional projection screens, the screen according to the invention may be a solid screen made from an opaque material which has been made transparent in a plurality of small areas so as to form the open structure, or the screen may be made from a transparent material which has been made opaque in selected areas so as to form the open structure. Thus, the desired pattern of opaque areas may be imprinted on the transparent sheet or the material may be made non-transparent in any other suitable manner. As an example, the screen may be formed by a transparent plastic film, parts of which have been made opaque.

In the presently preferred embodiment, however, the projection medium comprises a screen of a perforated or net-like structure. Such a screen has opposite first and second side surfaces, and, preferably, the screen has such a perforated or net-like structure that the projected images may be watched by a viewer from the second side surface of the screen when these images are projected onto the first side surface of the screen. Alternatively or additionally, the perforated or net-like structure of the screen may be such that the screen becomes substantially invisible to a viewer watching the projected images against a dark background from a position spaced from said first or second side surface of the screen.

It has been found that when the screen has such a net-like or perforated structure the projected images may be watched from any of the opposite sides of the screen, and that the screen may be made substantially invisible to a viewer watching the projected images, which are preferably moving pictures, against a dark background from a position spaced from the screen. Preferably, the transition between the outline of the objects, persons or animals projected and the dark background is blurred or faded.

When the space in which the screen is located and illuminated properly, the projection medium may be made invisible to the viewer and the projected images or moving pictures may in a ghost-like or hologram-like manner look like freely floating in the space or room in which the projection medium is arranged. The images being projected may, for example, be objects, persons and/or other living beings, and the objects or living beings to be highlighted are preferably depicted on a dark or black background (black level 0). Preferably, the transition between the outline of the objects or living beings and the dark background is blurred. Furthermore, residual light from a projector projecting the images should preferably be masked or screened, for example by means of a special lens or by means of a specially shaped light funnel (black wrap) through which the images are projected.

The images may be computer generated or projected from a video projector or a computer controlled projector onto one side surface of the projection medium, possibly via one or more mirrors and/or prisms. The projector may then be placed at a convenient location where it is not immediately visible to the viewer or viewers.

Opposite sides of the projection medium may be watched at the same time by first and second viewers positioned in front of and spaced from opposite sides, respectively, of the medium. Especially in this case the images projected onto the projection medium or screen may form part of a computer game. In the latter case the viewers may activate control means, such as pedals, steering wheels, joysticks, stepping panels or the like, and thereby interact with the game performance.

The openings or perforations in the net-like or perforated structure of the screen are mutually separated by solid partition parts. These solid parts should preferably have a width, which is only a small fraction of the maximum dimension of the openings or perforations. This means that the total area of the openings or perforations should preferably substantially exceed half the area of the screen and preferably be ⅔ or more. The single opening or perforation should not be too large. Thus, the openings or perforations of the screen should preferably have a maximum dimension in the range of 0.5–2.5 mm, preferably 1–12 mm and more preferably about 1.2–1.5 mm. The screen is preferably white or light and non-glossy.

Each of he openings or perforations may have any shape or outline, and even though preferred they need not be identical. As examples, the openings or perforations may have a circular or a polygonal shape, such as a hexagonal, rectangular, square or triangular, shape or outline.

In practice it has been found that tulle, such as bridal veil or bridal tulle, with a net-like structure defining hexagonal openings is very suitable for use as the screen.

It has been found that a proper veil-like nylon fabric for use as a screen in the method according to the invention is marketed by John Heathcoat & Co. Ltd., Tiverton, Devon, England under the Quality Number A1027 F.

In order to make the screen invisible to the viewer, the space defined behind said first side of the screen is preferably kept darker than the side of the screen being watched. Preferably the illumination of the said space is only 10–30% of the illumination of the side of projection medium facing the viewer.

The images are suitably projected on the screen by means of a projector, and the images are preferably projected in a direction defining an acute angle with said first surface of the screen. The projector may then be positioned adjacent to the ceiling, a wall or the floor of a room in which the screen is arranged, whereby the projector may be placed concealed or invisible to the viewer. Of course the projector may, alternatively, be concealed in other manner, for example covered by a screen.

The projection medium or screen on which the images are projected may be arranged in a horizontal, oblique or a vertical plane. Thus, the screen may, for example, be horizontal and be arranged above the viewer. In such case moving pictures showing, for example, airplanes or other flying objects may be projected onto the screen from the upper or lower side thereof. As another example, the screen may be arranged in a room so as to divide the same into first and second chambers defined by said first and second surfaces, respectively, of the screen. A projector may be arranged in the first chamber, which is preferably kept darker than the second surface of the screen, which may be arranged opposite to and spaced from a show window or a display window of a shop or store. In the latter case the moving pictures being projected may, for example, be a model wearing and changing clothes, which are for sale in the store.

According to another aspect, the present invention also provides an image projecting arrangement, comprising means for defining a projection medium comprising a screen forming an open, light-penetrable structure, which is formed by a plurality of adjacent small light penetrable and light reflecting areas, respectively, and a projector for projecting the images onto said medium. This projection medium or screen may be of any of the above mentioned types and structures.

Furthermore, according to a third aspect, the present invention provides use of a screen forming an open, light-penetrable structure, which comprises a plurality of small light-reflecting, preferably differently orientated surface parts, and a plurality of adjacent small light-penetrable areas, respectively, as a projection medium for moving pictures.

Such medium may be defined in any of the manners described above and may, for example, comprise a screen, wherein the open structure has been formed by a plurality of adjacent small light-penetrable and light reflecting areas, respectively. Thus, as examples, the screen may be formed by a transparent film, parts of which have been made opaque, or from a fabric or sheet material having a perforated or net-like structure. Preferably, in the latter case, the screen has such a perforated or net-like structure that images projected on one side surface thereof may be watched by a viewer from the opposite side surface of the screen, and/or that the screen becomes substantially invisible to a viewer watching the projected images against a dark background from a position spaced from the screen.

According to a fourth aspect, the present invention provides a projection screen arrangement comprising first and second spaced uprights extending from a floor or ground surface, said first upright comprising a reel for reeling and unreeling a projection screen thereon, the free end of the screen comprising connecting means for releasably connecting the free end of the screen to the second upright, and biasing means for tightening the screen when extending between the first and second uprights. The uprights may be in the form of sculptural, aesthetic columns, so that they do not unfavorably influence the visual impression of the room when the screen is not in use. The connection means may be of a very simple type and may, for example, comprise at least one, preferably two, hook member(s) for engaging with the second upright. The screen may be of a conventional type or any of the screen types described above. However, it is preferably made from tulle. In the latter case, it may be necessary to reinforce or strengthen the upper and/or lower edge of the screen by means of a suitable string or line.

BRIEF DESCRIPTION OF THE DRAWINGS

The invention will now be further described with reference to the enclosed diagrammatic drawings, wherein:

FIG. 8 is a front view of a projection screen system mounted on a floor surface;

FIG. 9 is a top view of the screen system of FIG. 8 shown in an enlarged scale;

FIG. 10 is a fragmentary view of the upper edge of the projection screen;

DETAILED DESCRIPTION OF THE INVENTION

Figure 1:
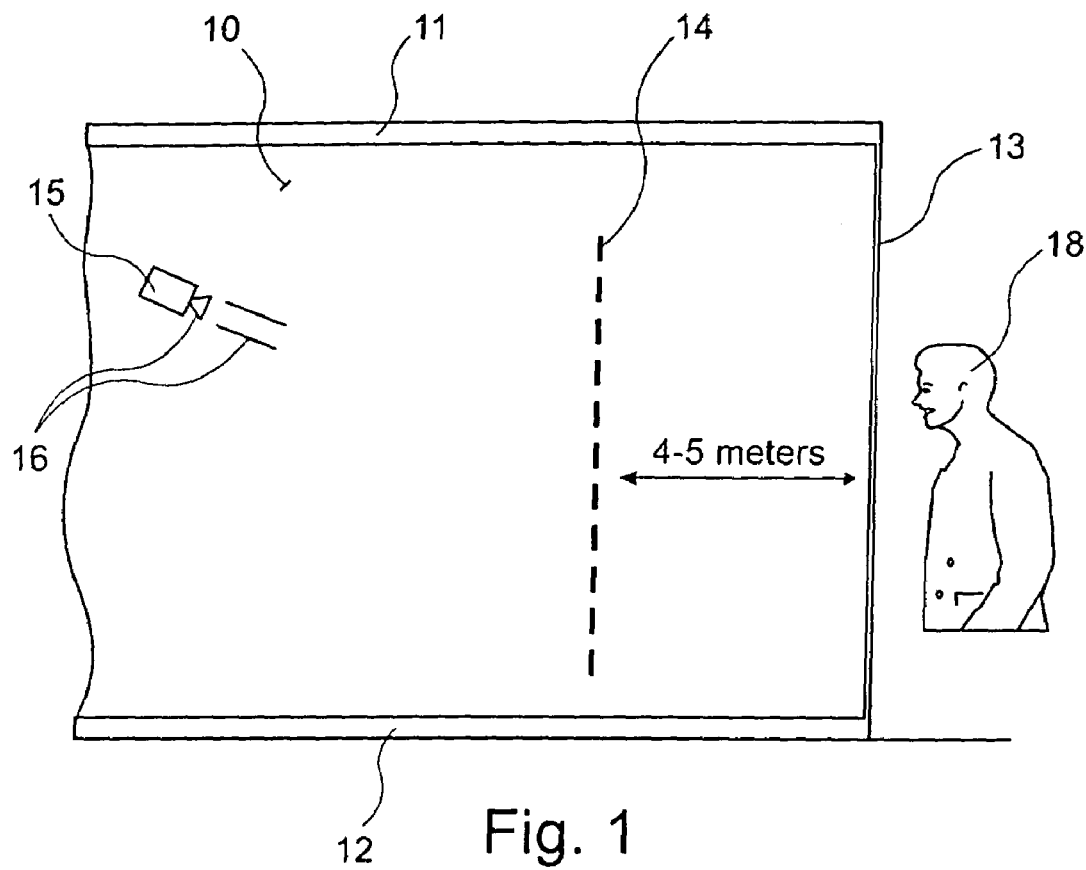
FIG. 1 is a vertical sectional view of a room or shop with an arrangement according to the invention.

FIGS. 1–4 illustrate a room or shop having a pair of opposed side walls 10, a ceiling 11 and a floor 12. An end wall comprises a show window or display window 13. In the embodiments illustrated in FIGS. 1–4, a screen 14 extends transversely to the side walls 10 and substantially parallel to and spaced from the window 13, for example with a distance of 4–5 m.

The screen 14 is a net-like or perforated fabric or sheet material, for example bridal veil or tulle. A video projector 15 with a light funnel or light screens 16 (shown in FIGS. 1 and 2) projects moving pictures onto the screen 14. In the embodiments shown in FIGS. 1, 2 and 4, the projector projects light onto the back side of the screen 14, i.e. the side facing away from the window 13. The space 17 behind the screen 14 is kept dark, and parts of the room in front of the screen 14 are preferably illuminated by spot lights, not shown.

Figure 2:
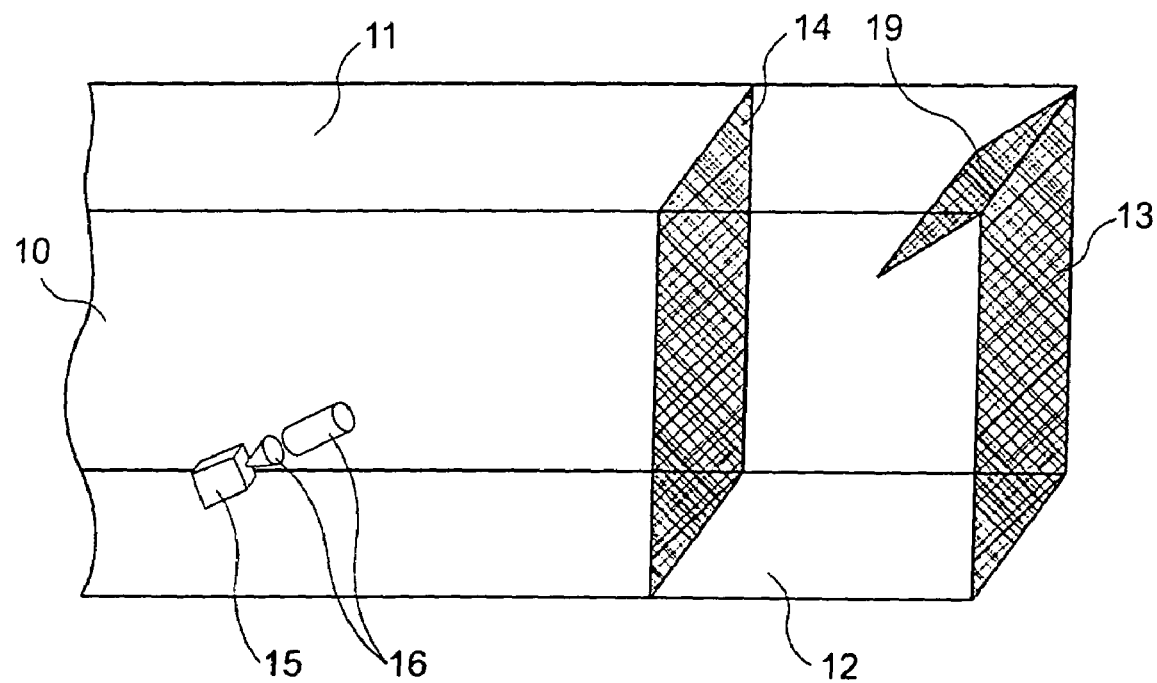
FIG. 2 is a perspective side view of the arrangement shown in FIG. 1.

A person or viewer 18 standing outside the room or shop and looking through the window 13 can then neither see the screen 14 nor the projector 15. However, the viewer will see the projected moving object or person in the middle of the room like a hologram. As indicated in FIG. 2 a light trap or screen 19 may be arranged at the upper end of the window 13 to suppress or catch reflected or scattered light.

Figure 4:
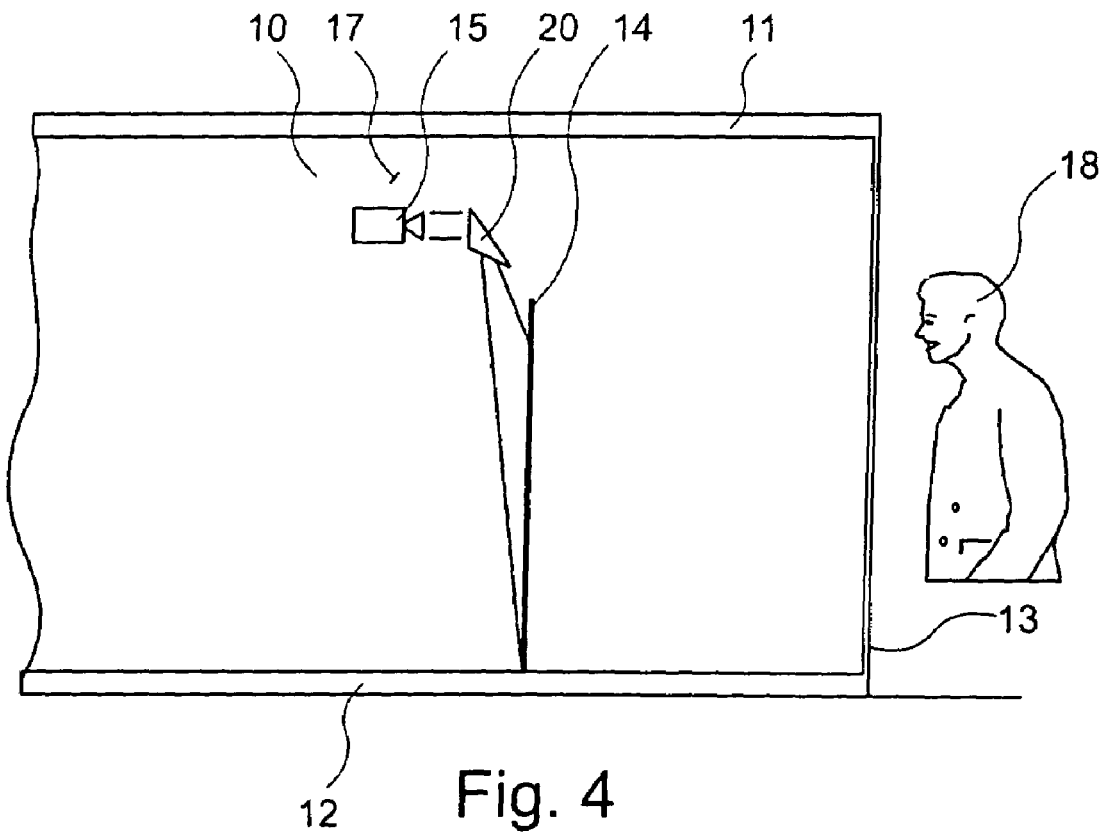

In the embodiment shown in FIG. 4, the projector 15 projects images or moving pictures onto the backside of the screen via a prism 20, which could be replaced by one or more mirrors, if desired. In other respects the arrangements shown in FIG. 4 functions similarly to the arrangements illustrated in FIGS. 1 and 2.

Figure 3:
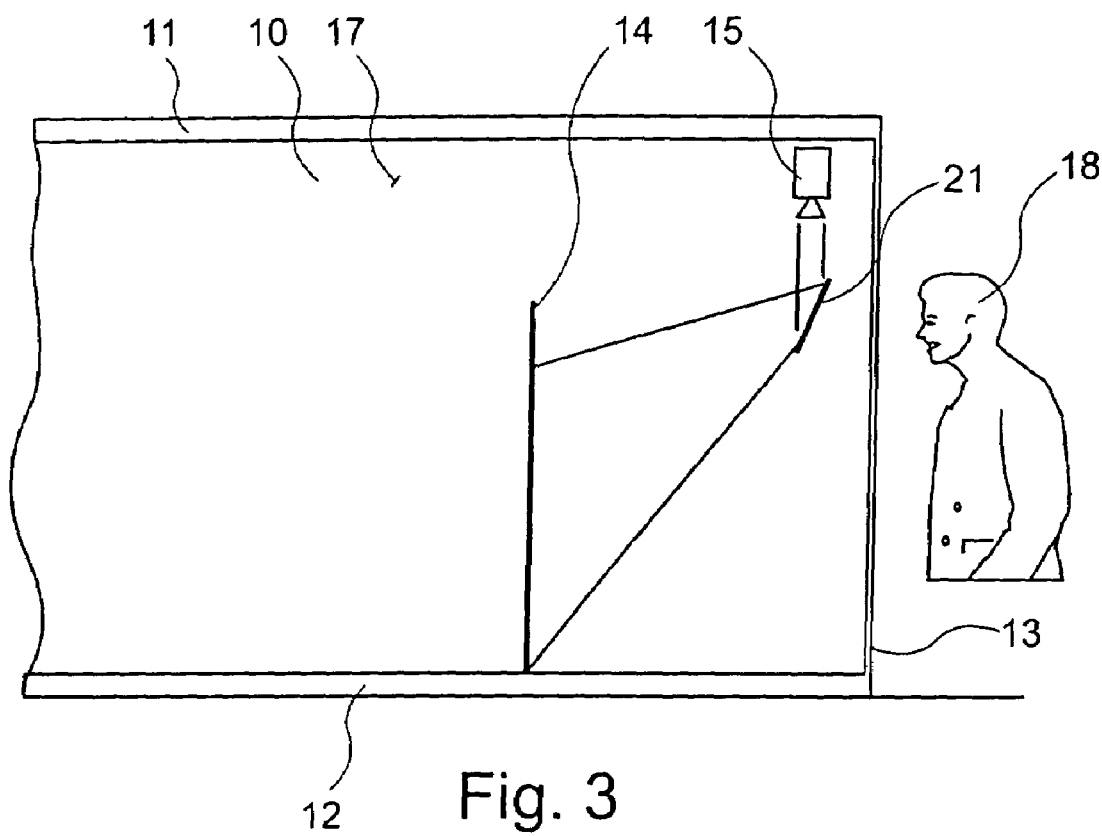
FIGS. 3 and 4 are vertical sectional views of a shop or a room with further embodiments of the arrangement according to the invention, the projectors being arranged in different positions.

In the arrangement illustrated in FIG. 3, the projector 15 projects images, such as moving pictures, onto the front side of the screen 14, which means the side opposite to the window 13. The projector 15 is positioned at the upper part of the end wall containing the window 13 so that the projector is invisible to the viewer 18 standing at the outside of the window 13. The images are projected onto the screen 14 via one or more light reflectors or mirrors 21. It has been found that by this arrangement a similar effect may be obtained as when the images are projected onto the backside of the screen 14, as illustrated in FIGS. 1, 2 and 4 and as described above.

Figure 5:
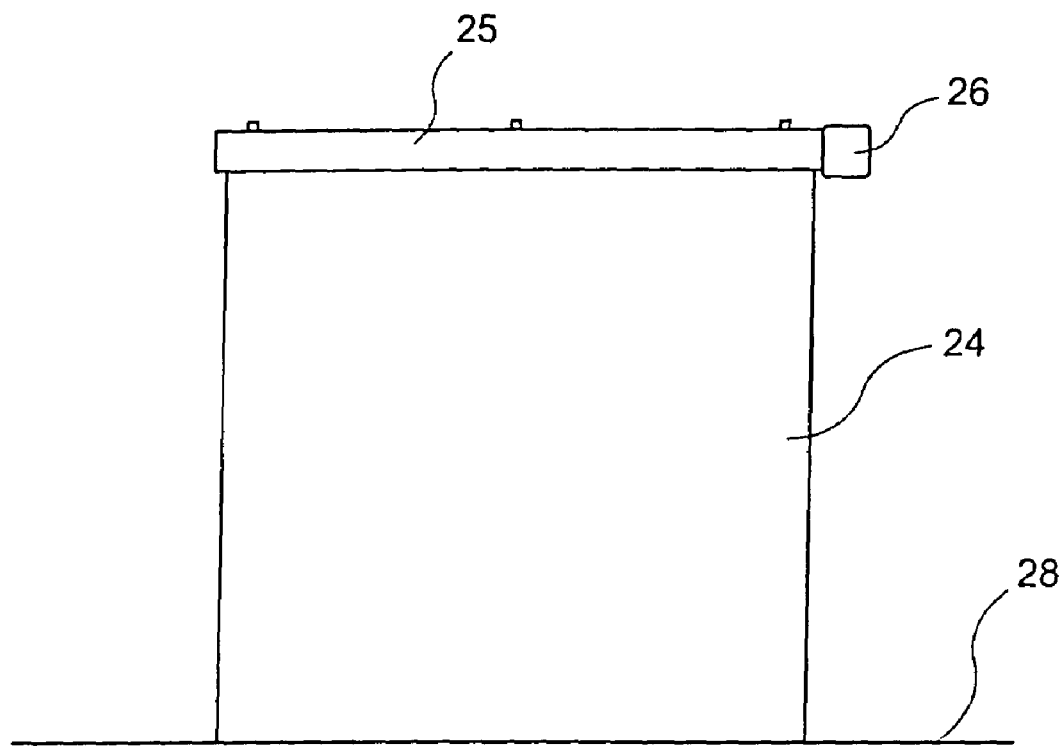
FIG. 5 is a projection screen with a reel device mounted at a ceiling.
Figure 6:
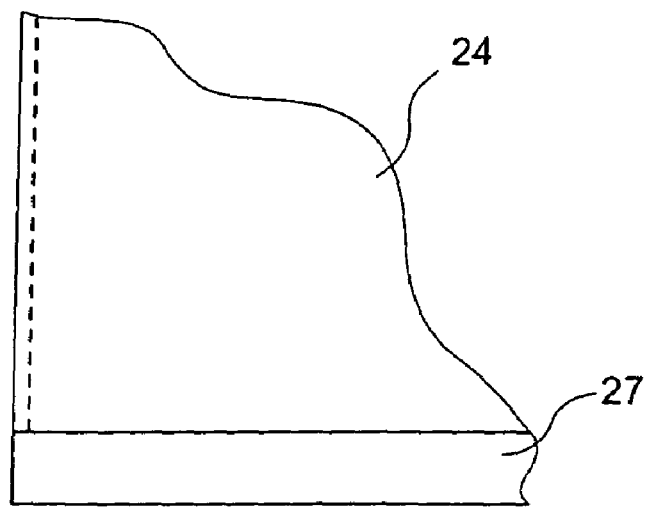
FIG. 6 is a fragment of the lower part of the screen shown in FIG. 5.
Figure 7:
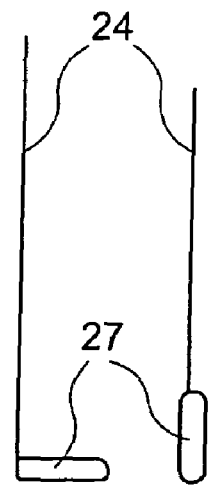
FIG. 7 shows vertical sectional views of the lower part of the screen illustrated in FIGS. 5 and 6.

FIGS. 5–7 illustrate a projection screen 24 and an associated reel device 25, which may be mounted on a ceiling and from which the screen may be unreeled. The reel device 25 comprises an electric motor 26, which may be operated so as to reel or to unreel the screen 24. The opposite vertical edges of the screen are preferably guided in slits or slots so as to be invisible to the user. As shown in FIGS. 6 and 7, a metal strip 27 is preferably connected to the lower edge of the screen so as to ensure that the screen is kept tight and that the lower edge of the screen 24 is held in contact with a floor surface 28, when the screen is in its unreeled position. FIG. 7 shows alternative positions of the metal strip 27 when contacting the floor surface, and in order to keep the strip 27 in the desired position, permanent magnets (not shown) may be mounted at the floor surface to attract the iron strip 27.

FIGS. 8–10 illustrate an alternative projection screen arrangement which is mounted on a floor surface. The arrangement comprises a pair of spaced uprights or columns 29 and 30 extending substantially vertically from the floor surface 28. The upright 29 may function as a reel device 25 containing a reel 31 for reeling a projection screen 24, which may be unreeled so as to extend between the uprights as shown in FIG. 8. From the reel 31 the screen is passed around a guide roller 32 which to a certain degree is movable parallel to the plane of the extended projection screen 24 and spring biased in a direction so as to tighten the screen. Preferably, the reel 31 is easily exchangeable, so that a fractured or otherwise defective screen may easily be replaced with a new one, and the reel may include a rewinding device, such as a rewinding spring device of the type conventionally used in roller blinds. Handles 33 with hook-shaped connecting members 34 are mounted on the free end of the screen 24 as shown in FIG. 9. The hook-shaped connecting members 34 may releasably engage with complementary-shaped retaining members 35 formed on the upright 30. The screen 24 is preferably made from tulle, and in such case the upper and lower edges of the screen made be reinforced and kept straight by a string or wire 36 (FIG. 10) attached thereto, preferably by being passed through successive openings of the net-like screen 24.

Figure 11:
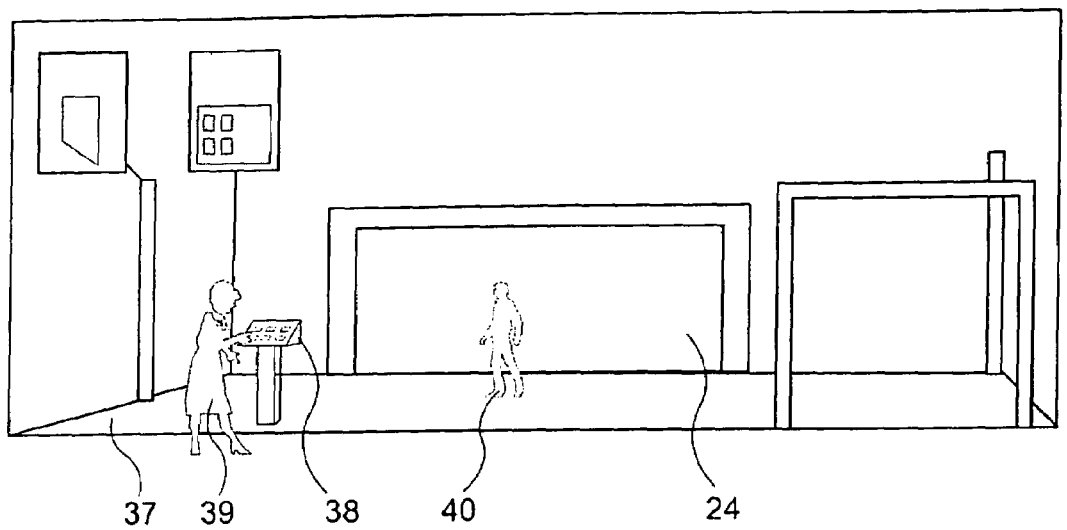
FIG. 11 a shop or show room with a projection arrangement, which may be operated or activated by a viewer positioned outside the room.

FIG. 11 illustrates how the image projecting arrangement according to the invention may be used in a shop or showroom. A projection screen arrangement of the type shown in FIGS. 5–7 or in FIGS. 8–10 may be mounted in the room such that the screen 24 is spaced from and extends in substantially in the same direction as a window 37 forming part of the walls defining the room. An activation unit, for example in the form of a touch screen 38, is arranged inside and immediately adjacent to the window, so that the touch screen may be activated by a person 39 standing at the outer side of the window 37. The person or viewer 39 may then select one of a plurality of video shows by touching the window opposite to the corresponding field or section of the touch screen 38. By using the method according the present invention, individuals and or objects may now be presented as if they were moving freely in the room. Thus, as an example, one or more models 40 may show a collection of clothing sold in the shop and selected by the viewer 39 by means of the touch screen 38. The screen 24 may be reeled and hidden within the reel device 25 in daytime when the shop is open, while the arrangement may be active at night after office hours.

Figure 12:
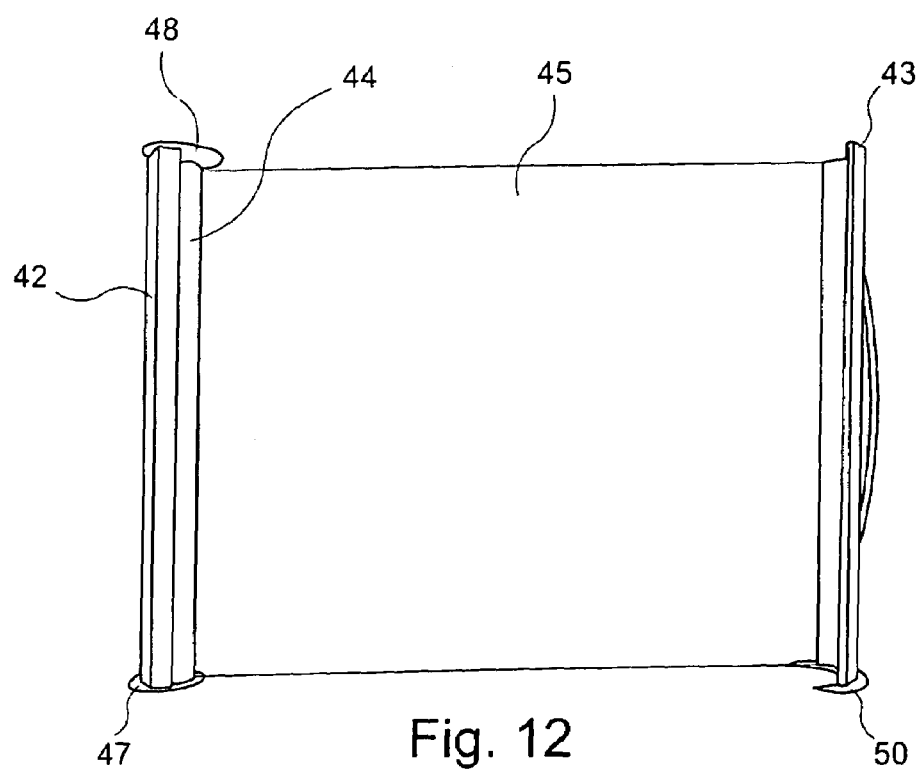
FIG. 12 is front view of a further embodiment of projection screen system as that illustrated in FIGS. 8 and 9 in a position of use.
Figure 13:
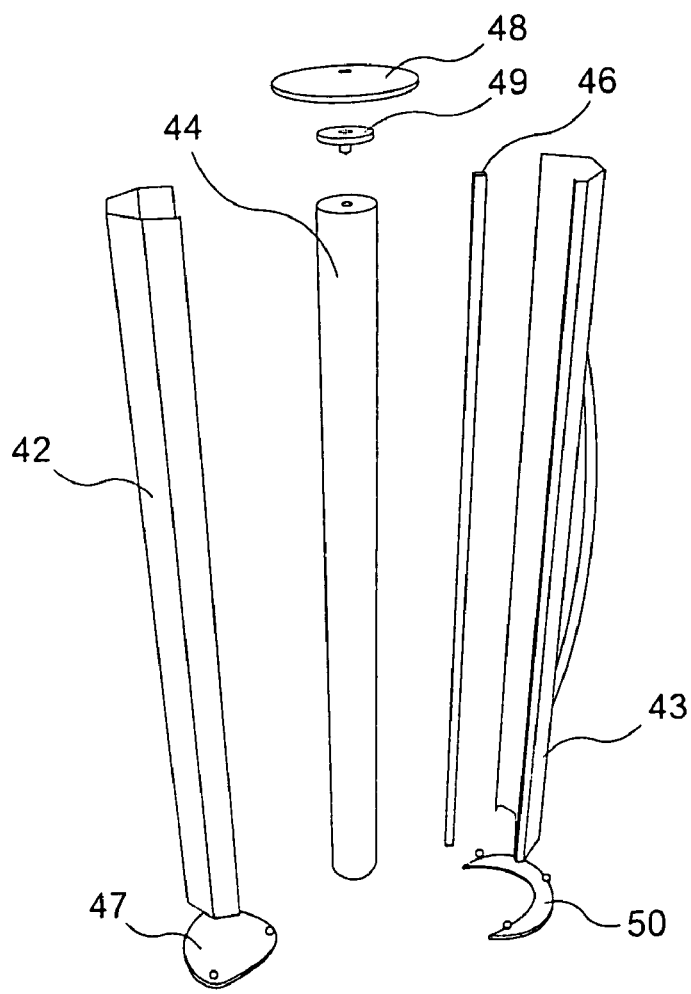
FIG. 13 is an exploded view of the system shown in FIG. 12.
Figure 14:
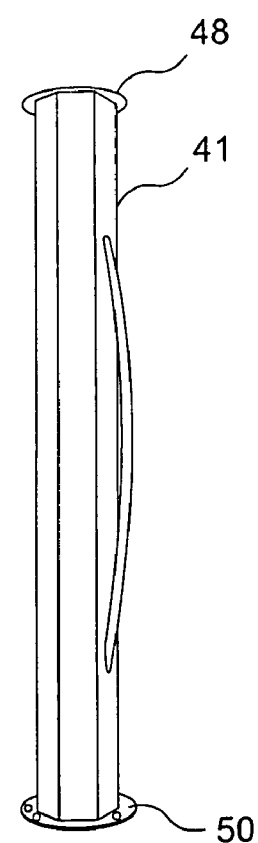
FIG. 14 is the projection screen system illustrated in FIGS. 12 and 13 in a storage position.

The projection screen system or arrangement shown in FIGS. 12–14 comprises a tubular upright or column 41, which may have, for example, a polygonal, such as an octagonal, cross-sectional shape, vide FIG. 14. The tubular column 41 is longitudinally divided into stationary and movable column parts 42 and 43, respectively, which may be releaseably interconnected in a storage position as shown in FIG. 14. The column 41 contains a reel 44 with a web of a fabric screen 45, such as tulle or bridal veil, winded thereon. The reel 44 is rotatably mounted in the stationary column part 42, and the free end of the fabric screen is connected to a strip 46 (FIG. 13), which may be connected to the movable column part 43. The stationary column part comprises a base plate or foot plate 47, which is adopted to be fixed to a floor surface so as to hold the stationary column part in an upright or vertical position, and a top plate or cover plate 48 with a rewinding device 49 for rewinding the fabric screen 45 onto the reel 44 when released.

The movable column part 43 also has a base plate or foot plate 50 integrally connected thereto and adapted to releasably engage with a fastening device (not shown) on the floor surface, so that the movable column part 43 may be held releasably in an upright or vertical position on the floor surface and transversely spaced from the stationary column part 42 with the screen 45 extending between the column parts as illustrated in FIG. 12.

It should be understood that the arrangement according to the invention could also be used outdoors at night, and the screen onto which the moving pictures are projected may be arranged horizontally above the heads of viewers, and the projector should then be arranged above or below the screen, as desired. Even though the method and arrangement according to the present invention may be used for any suitable purpose, such as for teaching, security and for military purposes, it has been found especially valuable for advertising or sales promotion purposes.

The invention claimed is:

1. An image projecting arrangement, comprising
a screen (14, 24, 45) having opposite first and second surfaces and arranged in a room having a pair of opposed side walls (10) and an end wall comprising a window (13), said screen extending transversely o the side walls is and substantially parallel to and spaced from the window, the screen brining an open, light penetrable structure, which is formed by a plurality of adjacent small light penetrable and light reflecting areas, respectively, whereby images projected on the screen are viewable from either of the first and second surfaces thereof; and a projector (15) for projecting the images onto one of the first and second surfaces of the screen.

2. An arrangement according to claim 1 wherein the screen is formed by a transparent film, parts of which have been made opaque.

3. An arrangement according to claim 2 wherein the screen is made from tulle.

4. An arrangement according to claim 1 wherein the screen is formed by a transparent film, parts of which have been made light reflecting.

5. An arrangement according to claim 1 wherein the screen (14, 24, 45) is of a perforated or net-like structure.

6. An arrangement according to claim 5 wherein the screen (14, 24, 45) has such an open structure that the screen becomes substantially invisible when the projected images are viewed against a darker background from a position spaced from one of said first and second side surfaces of the screen.

7. An arrangement according to claim 1 wherein the projector is adapted to project images in the form of moving pictures.

8. An arrangement according to claim 1 wherein the light penetrable areas of the screen are mutually separated by partition parts having a width being only a small fraction of the maximum dimension of the penetrable areas.

9. An arrangement according to claim 1 wherein the penetrable areas of the screen each has a maximum dimension in the range of 0.5 mm–2.5 mm.

10. An arrangement according to claim 1 wherein the penetrable areas have a shape selected from the group consisting of at least one of polygonal and circular.

11. An arrangement according to claim 10 wherein the penetrable areas have a shape selected from the group consisting of at least one of hexagonal, rectangular, square, and triangular.

12. An arrangement according to claim 1 wherein the projector (15) is positioned so as to project the images in a direction defining an acute angle with said first surface of the screen.

13. An arrangement according to claim 1 wherein the images are projected on the screen by means of a projector (15) arranged in a position so as not to be visible when the images projected on the screen are viewed.

14. An arrangement according to claim 1 wherein the projection screen (14, 24, 45) is positioned within a room comprising a transparent wall (37) spaced from the screen, the arrangement further comprising a control device (38) for controlling the operation of the projector positioned so as to be accessible from outside the room.

15. An arrangement according to claim 14 wherein the control device comprises a touch screen (38) operable to select images to be projected.

16. An arrangement according to claim 14 wherein the control device is arranged at the inner side of the transparent wall and may be activated from the outer side of the transparent wall.

17. An arrangement according to claim 1 wherein the projection screen (14, 24, 45) is arranged in a room so as to divide the same into first and second chambers defined by opposite first and second surfaces of the screen, respectively the projector (15) being arranged in the first chamber (17), which is kept darker than he second chamber, the second surface of the screen being arranged opposite to and spaced from a window (37).

18. An arrangement according to claim 1 further comprising first and second spaced uprights (29, 30) extending from a floor or ground surface (28) of the room, said first upright (29) comprising a reel (31) for reeling and unreeling the projection screen (45) thereon, the free end of the screen comprising connecting means (34) for releasably connecting the free end of the screen to the second upright (30), and biasing means (32) for tightening the screen when extending between the first and second uprights.

19. An arrangement according to claim 18 wherein the connection means comprise at least one hook member (34) for engaging with the second upright (30).

20. An arrangement according to claim 18 wherein the upper and lower edges of the screen are reinforced by strings or lines (36).

* * * * *